United States Patent
Nguyen et al.

(10) Patent No.: US 8,594,031 B2
(45) Date of Patent: Nov. 26, 2013

(54) METHOD AND APPARATUS FOR PROVIDING QUALITY OF SERVICE FOR SIMILAR PRIORITY LOGICAL CHANNELS

(75) Inventors: Bao V. Nguyen, Corona, CA (US); Srividhya Krishnamoorthy, San Diego, CA (US); Vanitha A. Kumar, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 12/895,980

(22) Filed: Oct. 1, 2010

(65) Prior Publication Data
US 2011/0243076 A1 Oct. 6, 2011

Related U.S. Application Data

(60) Provisional application No. 61/250,231, filed on Oct. 9, 2009.

(51) Int. Cl.
*H04W 4/00* (2009.01)

(52) U.S. Cl.
USPC .......................................... 370/329; 370/468

(58) Field of Classification Search
USPC .......................................... 370/227–228, 329
See application file for complete search history.

(56) References Cited

U.S. PATENT DOCUMENTS

| | | | | |
|---|---|---|---|---|
| 7,561,509 B2 * | 7/2009 | Hsu et al. | | 370/204 |
| 7,873,006 B2 * | 1/2011 | Yi et al. | | 370/329 |
| 8,514,703 B2 * | 8/2013 | Lee et al. | | 370/230.1 |
| 2005/0085235 A1 * | 4/2005 | Park et al. | | 455/450 |
| 2006/0105761 A1 * | 5/2006 | Walton et al. | | 455/423 |
| 2007/0058583 A1 * | 3/2007 | Cho et al. | | 370/329 |
| 2007/0070894 A1 * | 3/2007 | Wang et al. | | 370/230 |
| 2010/0020757 A1 * | 1/2010 | Walton et al. | | 370/329 |
| 2011/0069666 A1 * | 3/2011 | Kahn et al. | | 370/329 |
| 2011/0128870 A1 * | 6/2011 | Madan et al. | | 370/252 |
| 2011/0243076 A1 * | 10/2011 | Nguyen et al. | | 370/329 |

FOREIGN PATENT DOCUMENTS

| | | |
|---|---|---|
| TW | 200807996 A | 2/2008 |
| WO | WO 2008156275 A2 * | 12/2008 |
| WO | WO2008156275 A2 | 12/2008 |

OTHER PUBLICATIONS

Huawei Technologies, Logical Channel Soft Priority and Power Allocation, Aug. 2004, 3Gpp, R2-041531.*

Huawei Technologies, Logical channel soft priority and power allocation, Aug. 2004, 3GPP TSG RAN WG2 Meeting #43, R2-041531.*

(Continued)

*Primary Examiner* — Michael J Moore, Jr.
(74) *Attorney, Agent, or Firm* — François A. Pelaez

(57) ABSTRACT

Methods and apparatuses are provided that facilitate providing quality of service for similar priority logical channels at least in part by assigning dynamic priority levels to the logical channels to allow certain logical channels to be assigned resources before other logical channels. Dynamic priority levels can be assigned based at least in part on a total accumulated used bytes of a given logical channel scaled by a prioritized bit rate of the logical channel. Thus, logical channels with a lower number of total accumulated used bytes scaled by the prioritized bit rate can be assigned higher priority to ensure resources are assigned to the logical channels. Moreover, the dynamic priority levels can be normalized to align the dynamic priority levels within certain values so as not to interfere with other logical channels of different assigned priority.

27 Claims, 7 Drawing Sheets

(56) References Cited

OTHER PUBLICATIONS

"Logical channel soft priority and power allocation", 3GPP Draft; R2-041531-Logical Channel Soft Priority and Power Allocation, 3RD Generation Partnership Project (3GPP), Mobile Competence Centre; 650, Route Des Lucioles; F-06921 Sophia-Antipolis Cedex; France, vol. Ran WG2, no. Prague, Czech Republic; 20060731, Jul. 31, 2006, XP050126242, [retrieved on Jul. 31, 2006].

"LTE; Evolved Universal Terrestrial Radio Access (E-UTRA); Medium Access Control (MAC) protocol specification (3GPP TS 36.321 version 8.6.0 Release 8)", Technical Specification, European Telecommunications Standards Institute (ETSI), 650, Route Des Lucioles ; F-06921 Sophia-Antipolis ; France, No. V8.6.0, Jul. 1, 2009, XP014044756, chapters 4.5.2 and 5.4.3.1.
International Search Report and Written Opinion—PCT/US2010/052098—International Search Authority, European Patent Office,Jan. 26, 2011.
Taiwan Search Report—TW099134437—TIPO—Jun. 27, 2013.

\* cited by examiner

METHOD AND APPARATUS FOR PROVIDING QUALITY OF SERVICE FOR SIMILAR PRIORITY LOGICAL CHANNELS

CLAIM OF PRIORITY UNDER 35 U.S.C. §119

The present Application for Patent claims priority to Provisional Application No. 61/250,231 entitled "QUALITY OF SERVICE FOR SAME PRIORITY LOGICAL CHANNELS," filed Oct. 9, 2009, and assigned to the assignee hereof and hereby expressly incorporated by reference herein.

BACKGROUND

1. Field

The following description relates generally to wireless communications, and more particularly to providing quality of service for communications over logical channels.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Moreover, for example, devices in wireless communications can assign a priority to a given logical channel or a grouping of logical channels. In this regard, devices can assign allocated resources to the logical channels according to priority (e.g., assign to a highest priority first, and then to a next highest priority, etc.), where the priority can be indicated such that lower values are higher priority, higher values are lower priority, etc. In addition, the logical channels can have an associated prioritized bit rate (PBR) that specifies an amount of data to be transmitted over a period of time (e.g., bytes per second), a bucket size duration (BSD), and/or the like. Thus, for example, devices can assign allocated resources according to priority by satisfying associated PBRs at each priority level. If resources remain after assigning to all logical channels, the device can assign remaining resources to the logical channels, again according to the priority. The device can assign a similar or same logical priority to a plurality of logical channels.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating associating dynamic priority levels to logical channels having a similar assigned priority level. The dynamic priority levels can be utilized in assigning allocated resources to the logical channels to ensure the logical channels with the similar assigned priority level are served substantially equally. For example, the dynamic priority levels can be computed separately for the logical channels based at least in part on a total accumulated amount of used data for the given logical channel scaled by a prioritized data rate of the given logical channel. The resulting value for the given logical channel can additionally be normalized with similar values for remaining logical channels and/or applied to the assigned priority level to create the dynamic priority level, for example.

According to an example, a method for wireless communication is provided that includes identifying a set of logical channels with at least substantially equal priority. The method also includes determining a dynamic priority level for a logical channel in the set of logical channels based at least in part on a total accumulated used bytes of the logical channel scaled by a prioritized bit rate of the logical channel.

In another aspect, a wireless communications apparatus for assigning dynamic priority levels is provided that includes at least one processor configured to identify a set of logical channels with at least substantially similar priority. The at least one processor is further configured determine a dynamic priority level for a logical channel in the set of logical channels based at least in part on a total accumulated used bytes of the logical channel scaled by a prioritized bit rate of the logical channel. In addition, the wireless communications apparatus includes a memory coupled to the at least one processor.

In yet another aspect, an apparatus for assigning a dynamic priority level to one or more logical channels is provided that includes means for identifying a set of logical channels with at least substantially equal priority. The apparatus further includes means for determining a dynamic priority level for a logical channel in the set of logical channels based at least in part on a total accumulated used bytes of the logical channel scaled by a prioritized bit rate of the logical channel.

Still, in another aspect, a computer-program product is provided for assigning dynamic priority levels including a computer-readable medium having code for causing at least one computer to identify a set of logical channels with at least substantially similar priority. The computer-readable medium further includes code for causing the at least one computer to determine a dynamic priority level for a logical channel in the set of logical channels based at least in part on a total accumulated used bytes of the logical channel scaled by a prioritized bit rate of the logical channel.

Moreover, in an aspect, an apparatus for assigning dynamic priority levels is provided that includes a channel priority determining component that identifies a set of logical channels with at least substantially equal priority. The apparatus further includes a dynamic priority level determining component that generates a dynamic priority level for a logical channel in the set of logical channels based at least in part on a total accumulated used bytes of the logical channel scaled by a prioritized bit rate of the logical channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
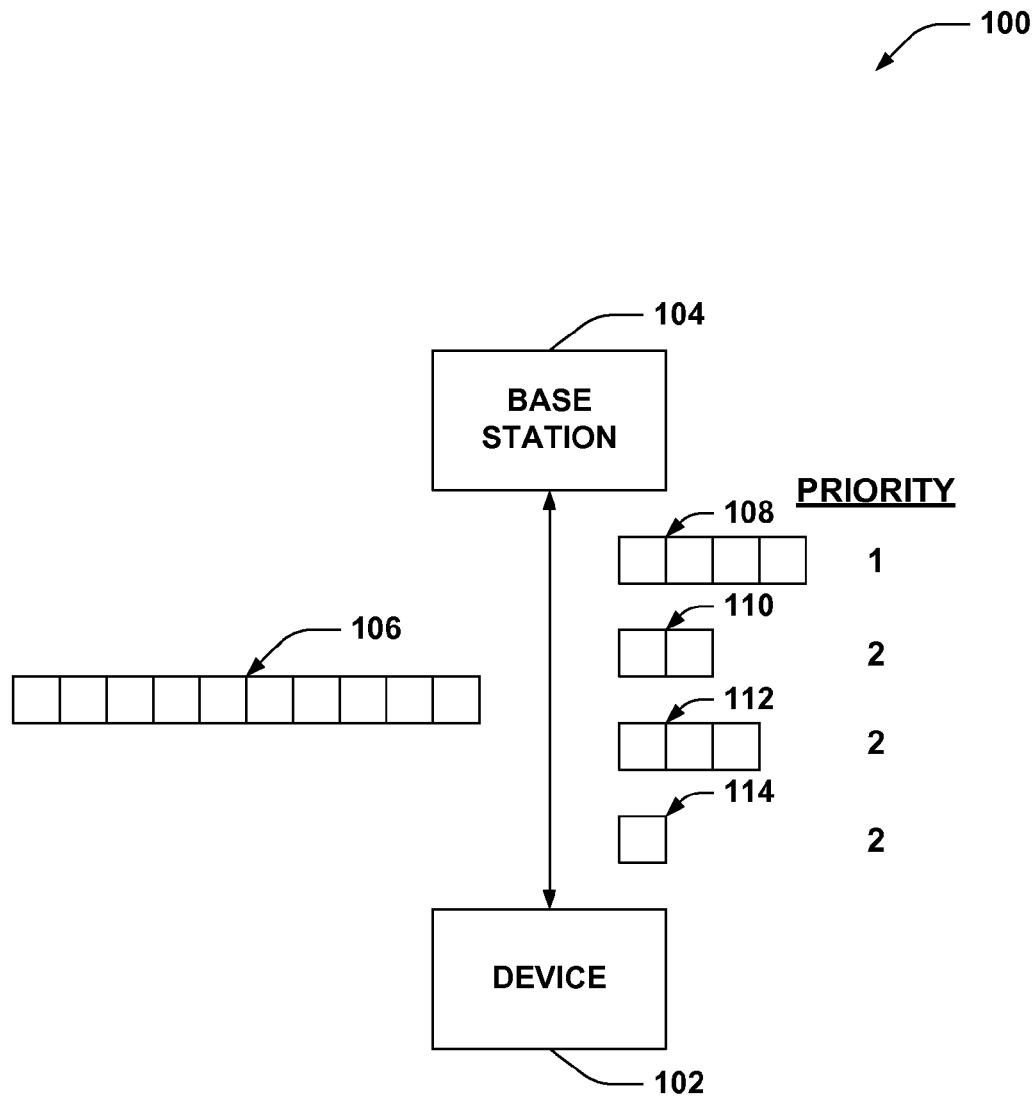
FIG. 1 illustrates an example system for assigning allocated resources among logical channels.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, dynamic priority levels can be defined for logical channels having a similar assigned priority to ensure quality-of-service over the logical channels. For example, a dynamic priority level can be determined based at least in part on an total amount of accumulated used data (e.g., a number of accumulated used bytes) for a given logical channel scaled by a prioritized data rate (e.g., prioritized bit rate (PBR)) for the logical channel. Thus, for example, after a period of time, the dynamic priority level for a given logical channel can be modified and can result in an increase or decrease in a number of resources assigned to the logical channel. In addition, the dynamic priority level can be determined by normalizing the scaled value across similar values for other logical channels having a similar or identical assigned priority and/or added to the assigned priority so as not to impact logical channels of other priorities.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that assigns allocated resources to logical channels according to an associated priority. System 100 includes a device 102 that can communicate with a base station 104 to provide access to a wireless network (not shown). For example, device 102 can be a UE, modem (or other tethered device), a portion thereof, or substantially any device that can receive access to a wireless network, such as a relay node, a mobile or other base station, and/or the like. Moreover, for example, base station 104 can be a macrocell, femtocell, picocell, or similar base station, relay node, mobile base station, UE (e.g., communicating in peer-to-peer or ad-hoc mode with device 102), a portion thereof, and/or substantially any device that provides one or more disparate devices with access to a wireless network.

According to an example, device 102 can connect to base station 104, and base station 104 can allocate uplink resources 106 to device 102 for communicating with the base station 104. In this regard, device 102 can assign the resources 106 to one or more logical channels for communicating different types of data to base station 104 (e.g., at different data rates, and/or the like). Device 102 can thus assign resources 106 among different logical channels, which can each have an associated priority and PBR. As depicted, for example, device 102 can assign a portion of the allocated resources 108 to a logical channel of priority 1, a portion of the allocated resources 110 to a logical channel of priority 2, a portion of the allocated resources 112 to a disparate logical channel of priority 2, and a portion of the allocated resources 114 to another disparate logical channel of priority 2.

Moreover, as described, device 102 can assign the allocated resources 106 to the logical channels in the above order (e.g. to logical channel of priority 1 first, then one of the logical channels of priority 2, etc.), assigning to each logical channel according to the corresponding PBR, as described. In this example, however, the portion of the allocated resources 114 assigned to a logical channel of priority 2 can be insufficient to fulfill the PBR of the logical channel, whereas the other logical channels of the same priority can be served according to the respective PBRs since these other logical channels are served first. This can impact QoS of the logical channels to which resource allocation 114 is assigned. In this regard, device 102 can compute a dynamic priority level for the logical channels of priority 2 to attempt to equalize QoS among the logical channels.

In one example, device 102 can determine the dynamic priority level for a logical channel based at least in part on an amount of accumulated used data (e.g., a number of accumulated used bytes) scaled by a related prioritized data rate (e.g., PBR). Thus, logical channels having a lower value can have a lower dynamic priority level, which can correspond to a higher priority as described (and thus can be served before channels with a higher value). In addition, for example, the dynamic priority level for the logical channels can be normalized among substantially all logical channels of the same or similar priority and applied to the assigned priority to mitigate impact on logical channels of other priority levels. Thus, for example, the logical channel with the portion of allocated resources 114 can be assigned a float value corresponding to the dynamic priority level (e.g., 2.1 or some other float value) that is less than that assigned to the logical channels with portions of allocated resources 110 and 112.

Moreover, for example, the dynamic priority levels can be assigned for each transmission, or according to some other time schedule, such that a logical channel having a same or similar priority as one or more other logical channels can be prioritized over the other logical channels where its number of accumulated used bytes scaled by PBR is less than that of the other logical channels. As a logical channel receives a higher priority (e.g., lower value), as described, it can transmit more data and its number of accumulated used bytes scaled by PBR can become greater than one or more of the other channels. Thus, in a subsequent time period, the logical channel may receive a lower priority as other logical channels. Furthermore, it is to be appreciated that higher priority values can be of higher priority and served first, in an alternative example. Thus, device 102 can normalize dynamic priority levels and subtract from the assigned. In addition, for example, though shown and described with respect to device 102, a base station or other network component can implement the functions described herein to attain similar QoS equalization for logical channels having similar priority.

Figure 2:
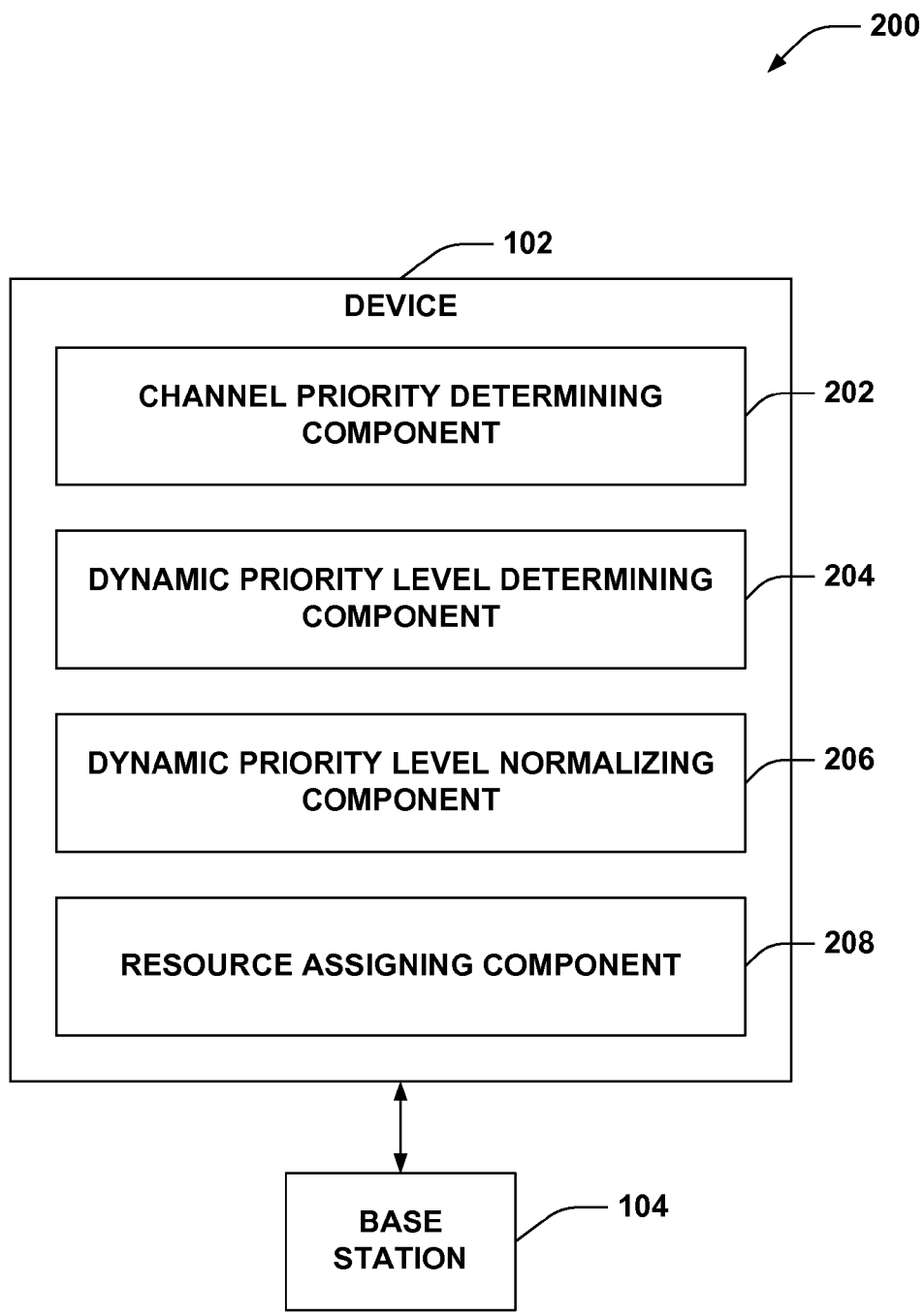
FIG. 2 illustrates an example system for determining dynamic priority levels for logical channels of similar assigned priority.

Turning to FIG. 2, illustrated is an example wireless communications system 200 that facilitates assigning dynamic priority levels to logical channels having a similar assigned priority level. System 200 comprises a device 102, which as described can communicate with a base station 104 over a plurality of assigned resources. Device 102 comprises a channel priority determining component 202 that can obtain a priority of a logical channel for assigning resources thereto, and a dynamic priority level determining component 204 that can generate a dynamic priority level for one or more logical channels based at least in part on an amount of accumulated used data for the one or more logical channels. Device 102 can also comprise a dynamic priority level normalizing component 206 that aligns the dynamic priority level within a boundary of values and/or applies the value to an assigned priority, and a resource assigning component 208 that assigns or otherwise schedules allocated resources to the logical channels according to a related priority, whether an assigned priority or dynamic priority level.

According to an example, channel priority determining component 202 can identify a priority assigned to a plurality of logical channels. As described, resources can be provided for the plurality of logical channels according to the priority and/or according to PBRs. Thus, resource assigning component 208 can assign resources from a resource allocation received from base station 104 to a highest priority logical channel (e.g., according to a lowest or highest priority value) based on its PBR, then to a next highest priority logical channel according to its PBR, and so on until either substantially all resources are allocated or until the lowest priority logical channel is allocated resources according to its PBR. In the latter case, it is to be appreciated that resource assigning component 208 can assign remaining resources to the logical channels according to priority, in one example. Device 102 can transmit data over the logical channels using the assigned resources.

As described, channel priority determining component 202 can obtain a similar or same priority for two or more logical channels, which can result in at least one of the channels not receiving adequate resources to meet its QoS while the other logical channels are assigned adequate resources, in one example. Thus, dynamic priority level determining component 204 can determine a dynamic priority level for each of the two or more logical channels with similar assigned priorities. For example, dynamic priority level determining component 204 can generate the dynamic priority levels based at least in part on a number of accumulated used bytes of a logical channels scaled by the PBR for the logical channel. For example, the accumulated used bytes can relate to a number of bytes transmitted in a given time period over the logical channel. Moreover, for example, the period of time can be configurable and/or can correspond to a number n of previous transmission periods instead of an actual time. In this regard, a logical channel with a lower number of accumulated used bytes scaled by PBR can have a lower dynamic priority level, which can indicate higher priority.

Moreover, for example, dynamic priority level normalizing component 206 can align the dynamic priority level in a range of values to mitigate impact on priority of other logical channels, where resource assigning component 208 treats higher priority values as higher priority, and/or the like. In one example, dynamic priority level normalizing component 206 can normalize the dynamic priority level based on dynamic priority levels determined for the other logical channels with the same or similar assigned priority. In this regard, dynamic priority level normalizing component 206 can normalize the dynamic priority level to a value greater than or equal to 0 and less than 1. In addition, dynamic priority level determining component 204 can add the normalized value to the assigned priority to generate the dynamic priority level for the logical channel. Resource assigning component 208 can thus assign resources according to an assigned priority for a given logical channel and/or a dynamic priority level for logical channels having a similar or same assigned priority.

In one example, resource assigning component 208 can maintain a variable Bj for each logical channel j. Bj can be initialized to zero when the related logical channel is established, and incremented by the product PBR x time transmit interval (TTI) duration for each TTI, where PBR is the PBR of logical channel j. The value of Bj should not exceed an associated bucket size of logical channel j, and if the value of Bj is larger than the bucket size, resource assigning component 208 can set it to the bucket size. The bucket size of a logical channel can be PBR×BSD, where PBR and BSD can be configured by upper layers and determined by resource assigning component 208 for each logical channel. Resource assigning component 208 can perform a Logical Channel Prioritization procedure when a new transmission is performed by device 102.

In this example, the Logical Channel Prioritization procedure can include the following steps. Resource assigning component 208 can assign allocated resources to logical channels with Bj>0 in a decreasing priority order. If a PBR related to a current logical channel is infinity, resource assigning component 208 can assign resources to the logical channel for all data available for transmissions before meeting PBR of a lower priority logical channel. Resource assigning component 208 can then decrement Bj by the total size of media access control (MAC) service data units (SDU) served to the logical channel in the resource assignment. If resources remain after serving all logical channels with Bj>0, resource assigning component 208 can allocate additional resources to the logical channels in decreasing priority order until the data for the logical channel or a related uplink grant is exhausted. In addition, resource assigning component 208 can serve logical channels having equal assigned priority substantially equally, as described above and further herein, based at least in part on determining a dynamic priority level.

For example, channel priority determining component 202 can obtain substantially equal priority for three logical channels, x, y, and z. Assuming Rx, Ry, and Rz are the associated PBRs for the logical channels x, y, and z, respectively, Gx, Gy, and Gz are the total accumulated used bytes related to the logical channels, and G is the total accumulated used bytes of x, y, and z, resource assigning component 208 serves x, y, and z equally if the following formulas hold true:

$$Gx=(G*Rx)/(Rx+Ry+Rz)$$

$$Gy=(G*Ry)/(Rx+Ry+Rz)$$

$$Gz=(G*Rz)/(Rx+Ry+Rz)$$

In this regard, dynamic priority level determining component 204 can select dynamic priority levels for x, y, and z that aim to satisfy the above formulas. In addition, the above formulas can be rewritten as:

$$Gx/Rx=G/(Rx+Ry+Rz)$$

$$Gy/Ry=G/(Rx+Ry+Rz)$$

$$Gz/Rz=G/(Rx+Ry+Rz)$$

Thus, Gx/Rx=Gy/Ry=Gz/Rz, and dynamic priority level determining component 204 can determine dynamic priority levels for x, y, and z to attain substantially equal values for Gx/Rx, Gy/Ry, and Gz/Rz over time.

For example, for a given transmission by device 102, dynamic priority level determining component 204 can compute total accumulated used bytes scaled by PBR, Gx/Rx, Gy/Ry, and Gz/Rz, for each logical channel, and can assign a highest dynamic priority to the logical channel related to the lowest computation of Gx/Rx, Gy/Ry, and Gz/Rz. In fact, where a lower value indicates higher priority, dynamic priority level determining component 204 can determine the dynamic priority level for logical channels x, y, and z as the respective computed values Gx/Rx, Gy/Ry, and Gz/Rz. In either case, the logical channel with the lowest dynamic priority level can have an increased likelihood of transmitting data and attaining a related QoS, since it can be served first by resource assigning component 208, as described.

Moreover, dynamic priority level normalizing component 206 can normalize the dynamic priority levels, as described, to a value greater than or equal to zero and less than one. In this regard, dynamic priority level normalizing component 206 can determine normalized dynamic priority levels, Pnx, Pny, and Pnz according to the following formulas:

$$Pnx=(Gx/Rx)/((Gx/Rx)+(Gy/Ry)+(Gz/Rz))$$

$$Pny=(Gy/Ry)/((Gx/Rx)+(Gy/Ry)+(Gz/Rz))$$

$$Pnz=(Gz/Rz)/((Gx/Rx)+(Gy/Ry)+(Gz/Rz))$$

such that Pnx, Pny, and Pnz are between zero and one. If Pnx, Pny, or Pnz equal one, it can be set to zero. In addition, dynamic priority level normalizing component 206 can add the assigned priority level to the normalized dynamic priority level, such that the dynamic priority level is between the assigned priority level value and the assigned priority level value plus one. In another example, where higher priority value corresponds to higher priority, dynamic priority level normalizing component 206 can subtract the normalized dynamic priority level from the assigned priority level and increment by one. In either case, resource assigning component 208 can assign allocated resources, as described above, according to dynamic priority levels for logical channels having similar assigned priority levels without disturbing assignment for logical channels of other priority levels. Thus, for example, if channel priority determining component 202 identifies a priority of 2 for logical channels x, y, and z, dynamic priority level determining component 204 and dynamic priority level normalizing component 206 can generate a dynamic priority value for each logical channel as a float number greater than or equal to 2.0 and less than 3.0.

Figure 3:
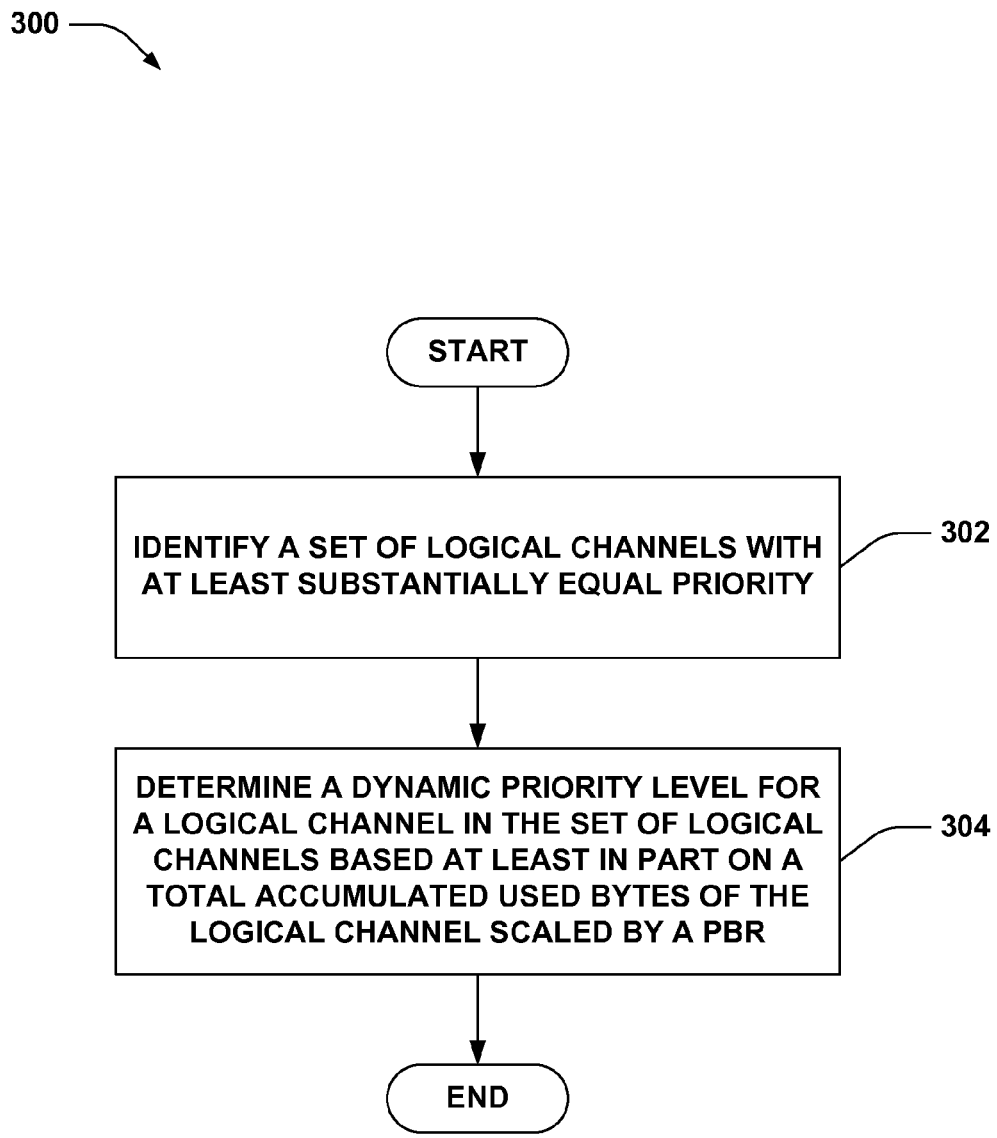
FIG. 3 illustrates an example methodology that facilitates determining a dynamic priority level for at least one logical channel.
Figure 4:
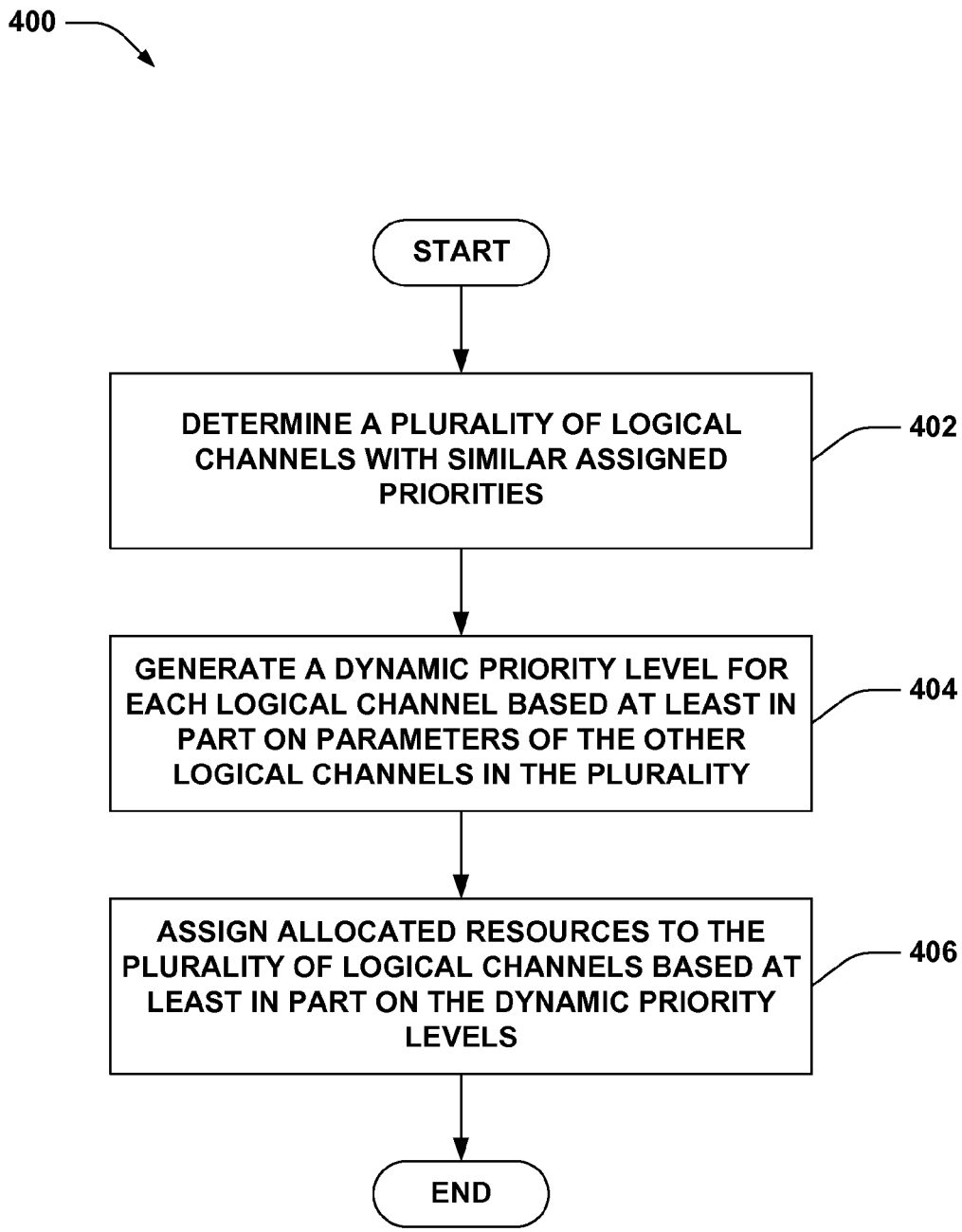
FIG. 4 illustrates an example methodology for assigning resources according to dynamic priority level.

Referring to FIGS. 3-4, example methodologies relating to defining dynamic priority levels for logical channels of similar assigned priority are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Turning to FIG. 3, an example methodology 300 is displayed that facilitates associating a dynamic priority level to one or more logical channels. At 302, a set of logical channels with at least substantially equal priority can be identified. As described, the set of logical channels can have a priority configured for transmitting certain data (e.g., to a base station or other wireless network component). At 304, a dynamic priority level can be determined for a logical channel in the set of logical channels based at least in part on a total accumulated used bytes of the logical channel scaled by a PBR. Thus, the dynamic priority level is based at least in part on a rate at which the logical channel is served compared to the other logical channels in the set. In this regard, a logical channel having a lowest computed accumulated used bytes scaled by PBR can have the highest dynamic priority level in the set of logical channels for a given transmission.

Referring to FIG. 4, illustrated is an example methodology 400 for assigning resources to logical channels based on dynamic priority levels. At 402, a plurality of logical channels with similar assigned priorities can be determined. At 404, a dynamic priority level can be generated for each logical channel based at least in part on parameters of the other logical channels in the plurality. Thus, as described, for a given logical channel, a dynamic priority level can be determined and normalized among the logical channels in the plurality. In one example, the dynamic priority level can be determined based at least in part on an accumulated used bytes for the given logical channel scaled by a PBR, and the dynamic priority level can be normalized according to similar values of the other logical channels. In addition, the normalized value can be added to the assigned priority, in one example, to generate the dynamic priority level. At 406, allocated resources can be assigned to the plurality of logical channels based at least in part on the dynamic priority levels.

It will be appreciated that, in accordance with one or more aspects described herein, inferences can be made regarding generating the dynamic priority level, normalizing the dynamic priority level, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 5:
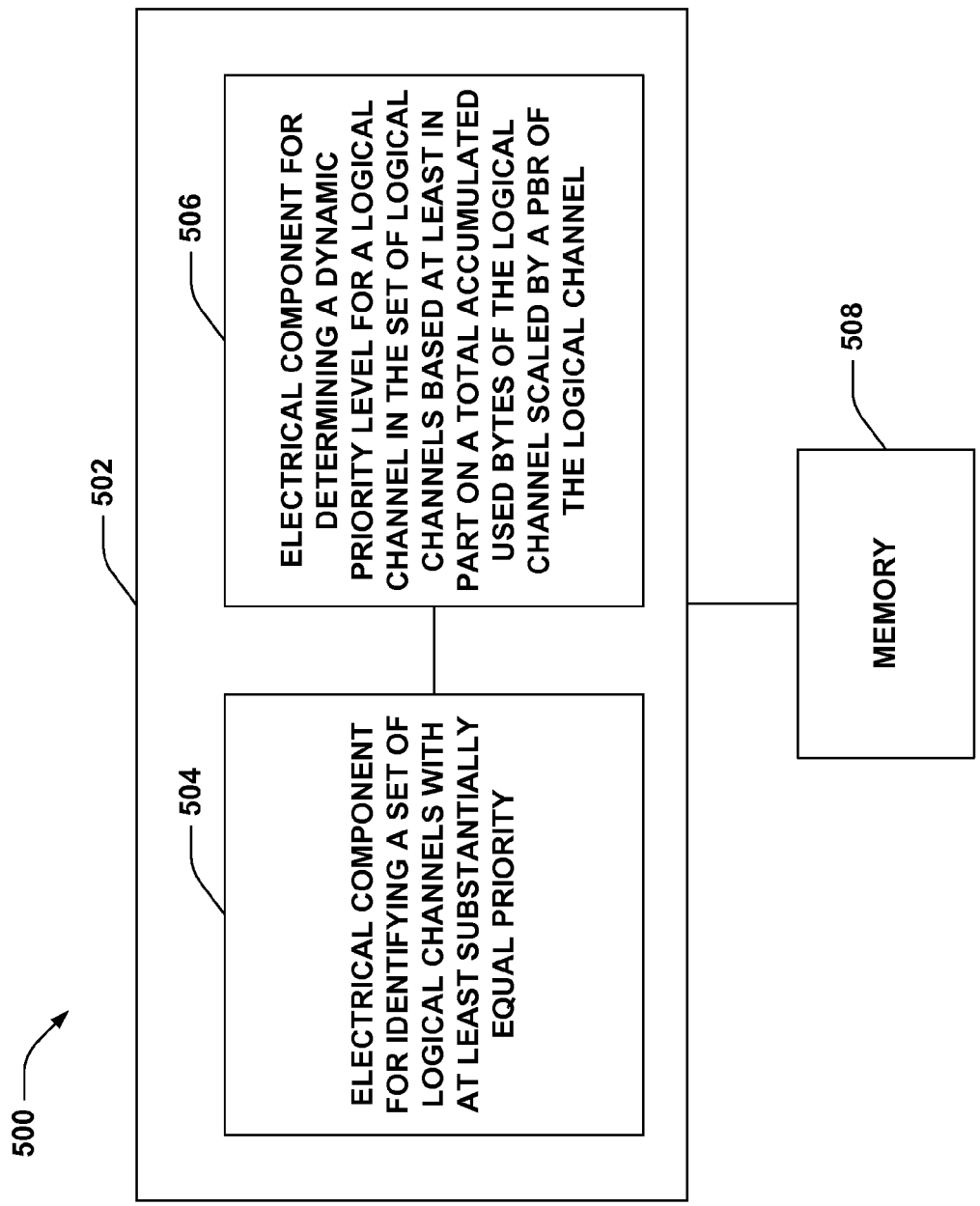
FIG. 5 illustrates an example system that determines a dynamic priority level for at least one logical channel.

With reference to FIG. 5, illustrated is a system 500 that determines dynamic priority levels for logical channels. For example, system 500 can reside at least partially within a base station, mobile device, etc. It is to be appreciated that system 500 is represented as including functional blocks, which can be functional blocks that represent functions implemented by a processor, software, or combination thereof (e.g., firmware). System 500 includes a logical grouping 502 of electrical components that can act in conjunction. For instance, logical grouping 502 can include an electrical component for identifying a set of logical channels with at least substantially equal priority 504. For example, system 500 can assign the priority, in one example, based at least in part on parameters related to data to be transmitted over the logical channel, a parameter of a related application, and/or the like. Moreover, logical grouping 502 can comprise an electrical component for determining a dynamic priority level for a logical channel in the set of logical channels based at least in part on a total accumulated used bytes of the logical channel scaled by a PBR of the logical channel 508. As described, associating the dynamic priority level with such parameters can ensure logical channels with low values receive a higher priority for a given transmission. Additionally, system 500 can include a memory 508 that retains instructions for executing functions associated with the electrical components 504 and 506. While shown as being external to memory 508, it is to be understood that one or more of the electrical components 504 and 506 can exist within memory 508.

Figure 6:
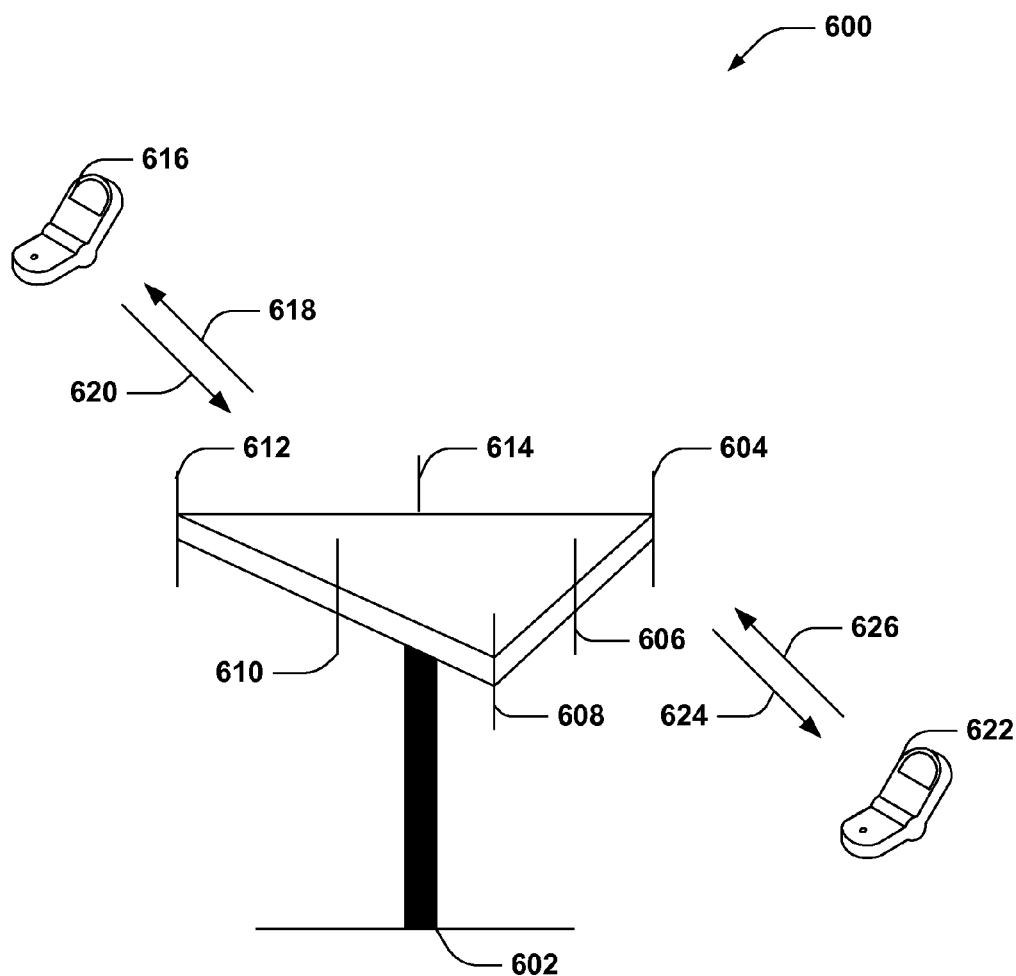
FIG. 6 is an illustration of a wireless communication system in accordance with various aspects set forth herein.

Referring now to FIG. 6, a wireless communication system 600 is illustrated in accordance with various embodiments presented herein. System 600 comprises a base station 602 that can include multiple antenna groups. For example, one antenna group can include antennas 604 and 606, another group can comprise antennas 608 and 610, and an additional group can include antennas 612 and 614. Two antennas are illustrated for each antenna group; however, more or fewer antennas can be utilized for each group. Base station 602 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 602 can communicate with one or more mobile devices such as mobile device 616 and mobile device 622; however, it is to be appreciated that base station 602 can communicate with substantially any number of mobile devices similar to mobile devices 616 and 622. Mobile devices 616 and 622 can be, for example, cellular phones, smart phones, laptops, handheld communication devices, handheld computing devices, satellite radios, global positioning systems, PDAs, and/or any other suitable device for communicating over wireless communication system 600. As depicted, mobile device 616 is in communication with antennas 612 and 614, where antennas 612 and 614 transmit information to mobile device 616 over a forward link 618 and receive information from mobile device 616 over a reverse link 620. Moreover, mobile device 622 is in communication with antennas 604 and 606, where antennas 604 and 606 transmit information to mobile device 622 over a forward link 624 and receive information from mobile device 622 over a reverse link 626. In a frequency division duplex (FDD) system, forward link 618 can utilize a different frequency band than that used by reverse link 620, and forward link 624 can employ a different frequency band than that employed by reverse link 626, for example. Further, in a time division duplex (TDD) system, forward link 618 and reverse link 620 can utilize a common frequency band and forward link 624 and reverse link 626 can utilize a common frequency band.

Each group of antennas and/or the area in which they are designated to communicate can be referred to as a sector of base station 602. For example, antenna groups can be designed to communicate to mobile devices in a sector of the areas covered by base station 602. In communication over forward links 618 and 624, the transmitting antennas of base station 602 can utilize beamforming to improve signal-to-noise ratio of forward links 618 and 624 for mobile devices 616 and 622. Also, while base station 602 utilizes beamforming to transmit to mobile devices 616 and 622 scattered randomly through an associated coverage, mobile devices in neighboring cells can be subject to less interference as compared to a base station transmitting through a single antenna to all its mobile devices. Moreover, mobile devices 616 and 622 can communicate directly with one another using a peer-to-peer or ad hoc technology as depicted. According to an example, system 600 can be a multiple-input multiple-output (MIMO) communication system.

Figure 7:
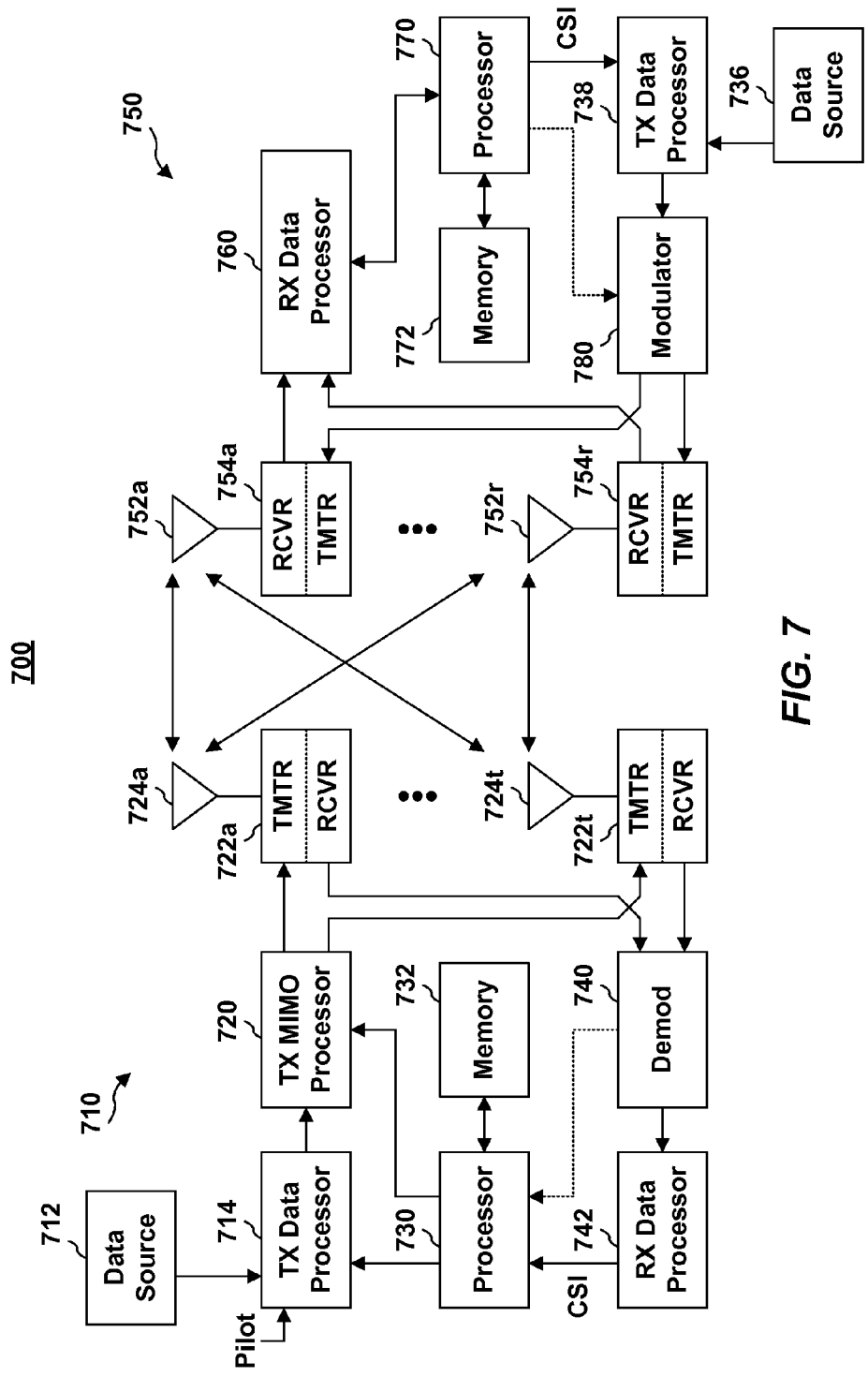
FIG. 7 is an illustration of an example wireless network environment that can be employed in conjunction with the various systems and methods described herein.

FIG. 7 shows an example wireless communication system 700. The wireless communication system 700 depicts one base station 710 and one mobile device 750 for sake of brevity. However, it is to be appreciated that system 700 can include more than one base station and/or more than one mobile device, wherein additional base stations and/or mobile devices can be substantially similar or different from example base station 710 and mobile device 750 described below. In addition, it is to be appreciated that base station 710 and/or mobile device 750 can employ the systems (FIGS. 1-2 and 5-6) and/or methods (FIGS. 3-4) described herein to facilitate wireless communication there between.

At base station 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides NT modulation symbol streams to NT transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 722a through 722t are transmitted from NT antennas 724a through 724t, respectively.

At mobile device 750, the transmitted modulated signals are received by NR antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the NR received symbol streams from NR receivers 754 based on a particular receiver processing technique to provide NT "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station 710.

A processor 770 can periodically determine which precoding matrix to utilize as discussed above. Further, processor 770 can formulate a reverse link message comprising a matrix index portion and a rank value portion.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station 710.

At base station 710, the modulated signals from mobile device 750 are received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights.

Processors 730 and 770 can direct (e.g., control, coordinate, manage, etc.) operation at base station 710 and mobile device 750, respectively. Respective processors 730 and 770 can be associated with memory 732 and 772 that store program codes and data. Processors 730 and 770 can also perform computations to derive frequency and impulse response estimates for the uplink and downlink, respectively.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communication, comprising:
   identifying a set of logical channels with at least substantially equal priority;
   determining, by a processor, a dynamic priority level for a logical channel in the set of logical channels based at least in part on a total accumulated used bytes of the logical channel scaled by a prioritized bit rate of the logical channel, wherein the total accumulated used bytes correspond to a number of bytes previously transmitted in a time period over the logical channel;
   normalizing the dynamic priority level for the logical channel based at least in part on disparate dynamic priority levels of one or more other logical channels in the set of logical channels having the at least substantially equal priority; and
   assigning a portion of allocated resources to the logical channel based at least in part on applying the normalized dynamic priority level to an assigned priority level of the logical channel.

2. The method of claim 1, further comprising:
   determining a disparate dynamic priority level for a disparate logical channel in the set of logical channels based at least in part on a disparate total accumulated used bytes of the disparate logical channel scaled by a disparate prioritized bit rate of the disparate logical channel; and
   assigning a disparate portion of the allocated resources to the disparate logical channel based at least in part on the disparate dynamic priority level.

3. An apparatus for assigning dynamic priority levels, comprising:
   at least one processor configured to:
     identify a set of logical channels with at least substantially similar priority;
     determine a dynamic priority level for a logical channel in the set of logical channels based at least in part on a total accumulated used bytes of the logical channel scaled by a prioritized bit rate of the logical channel, wherein the total accumulated used bytes correspond to a number of bytes previously transmitted in a time period over the logical channel;
     normalize the dynamic priority level for the logical channel based at least in part on disparate dynamic priority levels of one or more other logical channels in the set of logical channels having the at least substantially equal priority; and
     assign a portion of allocated resources to the logical channel based at least in part on applying the normalized dynamic priority level to an assigned priority level of the logical channel; and
   a memory coupled to the at least one processor.

4. The apparatus of claim 3, wherein the at least one processor is further configured to:
   determine a disparate dynamic priority level for a disparate logical channel in the set of logical channels based at least in part on a disparate total accumulated used bytes of the disparate logical channel scaled by a disparate prioritized bit rate of the disparate logical channel; and assign a disparate portion of the allocated resources to the disparate logical channel based at least in part on the disparate dynamic priority level.

5. An apparatus for assigning a dynamic priority level to one or more logical channels, comprising:
   means for identifying a set of logical channels with at least substantially equal priority;
   means for determining a dynamic priority level for a logical channel in the set of logical channels based at least in part on a total accumulated used bytes of the logical channel scaled by a prioritized bit rate of the logical channel, wherein the total accumulated used bytes correspond to a number of bytes previously transmitted in a time period over the logical channel;
   means for normalizing the dynamic priority level for the logical channel based at least in part on disparate dynamic priority levels of one or more other logical channels in the set of logical channels having the at least substantially equal priority; and
   means for assigning a portion of allocated resources to the logical channel based at least in part on applying the normalized dynamic priority level to an assigned priority level of the logical channel.

6. The apparatus of claim 5, further comprising:
   means for determining a disparate dynamic priority level for a disparate logical channel in the set of logical channels based at least in part on a disparate total accumulated used bytes of the disparate logical channel scaled by a disparate prioritized bit rate of the disparate logical channel; and
   means for assigning a disparate portion of the allocated resources to the disparate logical channel based at least in part on the disparate dynamic priority level.

7. A computer program product for assigning dynamic priority levels, comprising:
   a non-transitory computer-readable medium, comprising:
      code for causing at least one computer to identify a set of logical channels with at least substantially similar priority;
      code for causing the at least one computer to determine a dynamic priority level for a logical channel in the set of logical channels based at least in part on a total accumulated used bytes of the logical channel scaled by a prioritized bit rate of the logical channel, wherein the total accumulated used bytes correspond to a number of bytes previously transmitted in a time period over the logical channel;
      code for causing the at least one computer to normalize the dynamic priority level for the logical channel based at least in part on disparate dynamic priority levels of one or more other logical channels in the set of logical channels having the at least substantially equal priority; and
      code for causing the at least one computer to assign a portion of allocated resources to the logical channel based at least in part on applying the normalized dynamic priority level to an assigned priority level of the logical channel.

8. The computer program product of claim 7, wherein the computer-readable medium further comprises:
   code for causing the at least one computer to determine a disparate dynamic priority level for a disparate logical channel in the set of logical channels based at least in part on a disparate total accumulated used bytes of the disparate logical channel scaled by a disparate prioritized bit rate of the disparate logical channel; and
   code for causing the at least one computer to assign a disparate portion of the allocated resources to the disparate logical channel based at least in part on the disparate dynamic priority level.

9. An apparatus for assigning dynamic priority levels, comprising:
   a channel priority determining component that identifies a set of logical channels with at least substantially equal priority;
   a dynamic priority level determining component that generates a dynamic priority level for a logical channel in the set of logical channels based at least in part on a total accumulated used bytes of the logical channel scaled by a prioritized bit rate of the logical channel, wherein the total accumulated used bytes correspond to a number of bytes previously transmitted in a time period over the logical channel; and
   a dynamic priority level normalizing component that normalizes the dynamic priority level for the logical channel based at least in part on disparate dynamic priority levels of one or more other logical channels in the set of logical channels having the at least substantially equal priority, and assigns a portion of allocated resources to the logical channel based at least in part on applying the normalized dynamic priority level to an assigned priority level of the logical channel.

10. The apparatus of claim 9, wherein the dynamic priority level determining component generates a disparate dynamic priority level for a disparate logical channel in the set of logical channels based at least in part on a disparate total accumulated used bytes of the disparate logical channel scaled by a disparate prioritized bit rate of the disparate logical channel, and the resource assigning component assigns a disparate portion of the allocated resources to the disparate logical channel based at least in part on the disparate dynamic priority level.

11. The method of claim 1, wherein the time period corresponds to a plurality of previous transmission time periods.

12. The apparatus of claim 3, wherein the time period corresponds to a plurality of previous transmission time periods.

13. The method of claim 1, further comprising determining a float number indicative of an updated dynamic priority level for the logical channel based on the normalized dynamic priority level and the assigned priority level.

14. The method of claim 13, wherein the float number is determined based on adding the assigned priority level to the normalized dynamic priority level to keep the updated dynamic priority level between the assigned priority level and the assigned priority level plus one.

15. The method of claim 13, wherein the float number is determined based on subtracting the normalized dynamic priority level from the assigned priority level and incrementing by one.

16. The apparatus of claim 3, wherein the at least one processor is further configured to determine a float number indicative of an updated dynamic priority level for the logical channel based on the normalized dynamic priority level and the assigned priority level.

17. The apparatus of claim 16, wherein the float number is determined based on adding the assigned priority level to the normalized dynamic priority level to keep the updated dynamic priority level between the assigned priority level and the assigned priority level plus one.

18. The apparatus of claim 16, wherein the float number is determined based on subtracting the normalized dynamic priority level from the assigned priority level and incrementing by one.

19. The apparatus of claim 5, further comprising means for determining a float number indicative of an updated dynamic priority level for the logical channel based on the normalized dynamic priority level and the assigned priority level.

20. The apparatus of claim 19, wherein the float number is determined based on adding the assigned priority level to the normalized dynamic priority level to keep the updated dynamic priority level between the assigned priority level and the assigned priority level plus one.

21. The apparatus of claim 19, wherein the float number is determined based on subtracting the normalized dynamic priority level from the assigned priority level and incrementing by one.

22. The computer program product of claim 7, wherein the computer-readable medium further comprises code for causing the at least one computer to determine a float number indicative of an updated dynamic priority level for the logical channel based on the normalized dynamic priority level and the assigned priority level.

23. The computer program product of claim 22, wherein the float number is determined based on adding the assigned priority level to the normalized dynamic priority level to keep the updated dynamic priority level between the assigned priority level and the assigned priority level plus one.

24. The computer program product of claim 22, wherein the float number is determined based on subtracting the normalized dynamic priority level from the assigned priority level and incrementing by one.

25. The apparatus of claim 9, wherein the dynamic priority level determining component determines a float number indicative of an updated dynamic priority level for the logical channel based on the normalized dynamic priority level and the assigned priority level.

26. The apparatus of claim 25, wherein the float number is determined based on adding the assigned priority level to the normalized dynamic priority level to keep the updated dynamic priority level between the assigned priority level and the assigned priority level plus one.

27. The apparatus of claim 26, wherein the float number is determined based on subtracting the normalized dynamic priority level from the assigned priority level and incrementing by one.

* * * * *